United States Patent
Kirihata et al.

[11] Patent Number: 6,051,836
[45] Date of Patent: Apr. 18, 2000

[54] LOW-PROFILE DOME-SHAPED MULTI-LENS SYSTEM

[75] Inventors: Shinji Kirihata, Uji; Katsuhiro Uchisawa, Moriguchi; Masao Yamaguchi, Misato, all of Japan

[73] Assignee: Matsushita Electric Works, Ltd., Osaka, Japan

[21] Appl. No.: 09/015,789

[22] Filed: Jan. 29, 1998

[30] Foreign Application Priority Data

Jan. 30, 1997 [JP] Japan ..................................... 9-016942
Dec. 5, 1997 [JP] Japan ..................................... 9-336203

[51] Int. Cl.$^7$ ................................................. G02B 27/00
[52] U.S. Cl. ..................... 250/353; 250/DIG. 1; 250/342
[58] Field of Search .............................. 250/353, DIG. 1, 250/342

[56] References Cited

U.S. PATENT DOCUMENTS 4,930,864  6/1990  Kuster et al. .

*Primary Examiner*—Constantine Hannaher
*Assistant Examiner*—Andrew Israel
*Attorney, Agent, or Firm*—Greenblum & Bernstein, P.L.C.

[57] ABSTRACT

A multi-lens system provides a plurality of sensitive areas of even size over a wide panoramic field of view and reduces an exposure height of the system above an installation plane, yet assuring successful motion detection. The system has a dome-shaped shell with a plurality of convex lenses for collecting infrared radiation from the panoramic field of view to an optical detector positioned in a focal region. The lenses are distributed over a wide solid angular range to give the discrete sensitive areas. The focal region is offset towards a vertex of the shell from a point where optical axes of the outermost lenses at a maximum solid angle about the center axis intersect with each other. Thus, the outer lens at a greater angular disposition has a greater distance to the detector so that it could define its own sensitive area closer in size to the adjacent sensitive area defined by the adjacent lens at a less angular disposition, enabling to equalizing the discrete sensitive areas. Further, the exposure height of the system i.e., a vertical distance between the vertex of the shell and the outermost lens is reduced to achieve a low-profile installation design. The lens at a greater angular disposition about the center axis is set to have a greater focal length so as to provide an effective image spot in the focal region for detection of infrared radiation through each lens by the detector, thereby assuring a consistent motion detection over a widely distributed sensitive areas.

10 Claims, 8 Drawing Sheets

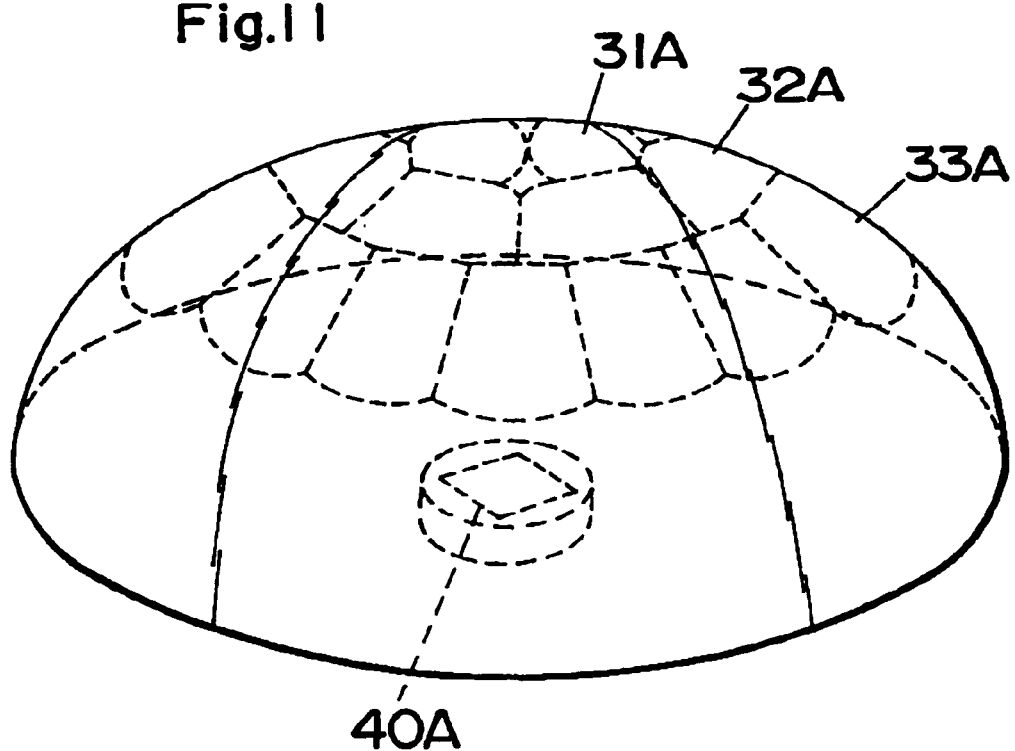
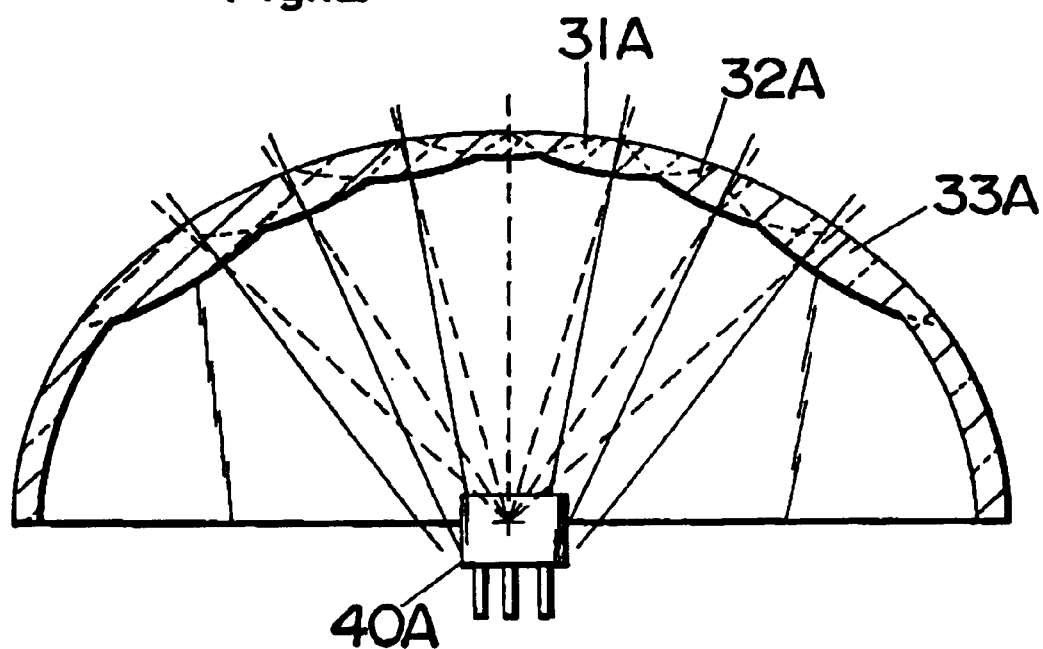

LOW-PROFILE DOME-SHAPED MULTI-LENS SYSTEM

BACKGROUND OF THE INVENTION

1. Field of the Invention

The present invention is directed to a low-profile dome-shaped multi-lens system, more particularly to such a system for collecting infrared radiation from a panoramic field of view to an optical detector for motion detection.

2. Description of the Prior Art

U.S. Pat. No. 4,930,864 discloses a prior lens system covering a panoramic field of view for infrared motion detection within a wide detection range. The system comprises a semispherical shell provided with a plurality of convex lenses arranged to define a plurality of sensitive areas in the panoramic field of view for collecting infrared radiation from each sensitive area to an optical detector. Upon receiving infrared radiation from persons or objects passing through the sensitive areas, the optical detector provides a signal of fluctuating radiation level which is processed by an associated electronic circuitry for detecting a motion of the persons or objects. This lens system is designed to give an equal focal length to all the lenses and to dispose the optical detector at a spherical center of the semispherical shell through which the optical axes of all the lenses pass. The lens system is capable of collecting infrared radiation from the discrete sensitive areas distributed over a wide solid angle ranging up to about $2\pi$ steradians. However, in this prior lens system, the peripheral lens disposed at a greater angular disposition about the center axis defines the peripheral sensitive areas of correspondingly larger size so as to give a difference in the size of the sensitive areas defined on a horizontal plane, i.e., a floor of a room when the system is mounted on a ceiling. The difference becomes more critical as the sensitive areas are distributed over a wider angular range, which makes it difficult to determine a precise motion detection at the peripheral sensitive areas as is possible for the center sensitive areas. It is therefore demanded to provide the sensitive areas of even size over a wide angular range in order to give a consistent motion detection over the widely distributed sensitive areas. Further, it is also desired for aesthetic reasons to reduce an exposure height measured along a center axis of the semispherical shell from the vertex thereof to the outermost lens, i.e., peripheral one disposed at a maximum angle about the center axis, provided that the remaining portion of the system can be concealed within the ceiling.

SUMMARY OF THE INVENTION

The present invention has been accomplished in view of the above problems to provide a unique multi-lens system suitable for a motion detection. Accordingly, it is a primary object of the present invention to give a plurality of sensitive areas of even size over a wide range, as well as to reduce the exposure height of the system above an installation plane, yet assuring successful motion detection.

The multi-lens system in accordance with the present invention comprises a dome-shaped shell formed with a plurality of convex lenses for collecting infrared radiation from a panoramic field of view to an optical detector positioned in a focal region. The dome-shaped shell has a vertex and a center axis extending through the vertex in a direction perpendicular to a tangent of the vertex. A plurality of the convex lenses each having an optical axis are distributed over a wide solid angular range about the center axis in order to provide a plurality of discrete sensitive areas within the panoramic field of view for surveillance by the detector. The focal region in which the detector is disposed is defined at a position offset towards the vertex from a point where the optical axes of the outermost lenses at a maximum solid angle about the center axis intersect with each other. With this result, the distance between the optical detector and the lenses is made longer for the outer lens disposed at a greater angle about the center axis. Thus, the outer lens positioned at a grater angle could define a corresponding discrete sensitive area of which size is closer to the adjacent sensitive area defined by the adjacent lens at a less angular disposition, in very contrast to the prior configuration in which all of the lenses are disposed at the same distance from the detector. Therefore, it is made possible to provide a plurality of discrete sensitive areas of even size over the panoramic field of view. In addition, provided that the same panoramic field of view is intended, the distance between the vertex of the shell and the outermost lens along the center axis can be made smaller than in the prior art configuration in which all the lenses are spaced from the detector at the same distance or radius, thereby contributing to reduce the exposure height of the shell when mounted on the ceiling or the like to give a low-profile structure to the lens system.

Notwithstanding the above low-profile structure, the convex lens at a greater angular disposition about the center axis is designed to have a greater focal length in order to provide a substantial image spot in the focal region for detection of the infrared radiation through each of the convex lens by the optical detector, thereby assuring a consistent motion detection over a widely distributed sensitive areas.

Preferably, the dome-shaped shell is formed along a curved surface of which curvature is greater towards its perimeter than at its vertex and the plurality of the lenses have the respective principal points positioned along the curved surface. For instance, the dome-shaped shell may be formed as a part of an ellipsoid having a minor axis coincident with the center axis.

Alternately, the dome-shaped shell may comprise more than one spherical segments having different curvatures which are smaller at the segment closer a periphery of the shell than at the segment adjacent the vertex of the shell.

Further, the dome-shaped shell may be formed as a part of a sphere and the focal region is positioned offset from a spherical center towards the vertex along the center axis.

Each of the lenses defines a lead axis which passes through the principal point of each lens and through a common point in the focal region. The lead axis for each lens is inclined at an angle with respect to the center axis for the same lens within a common plane. Based upon the finding that the motion detection could be successfully made even with a small deviation between the lead axis and the optical axis, the lens system can be designed without imposing a strict control of aligning the optical axis with the lead angle for each lens, thereby being given sufficient design flexibility for simple lens configuration with attendant ease of fabrication.

In a preferred embodiment, the dome-shaped shell is formed on its inner surface with a plurality of convex faces each forming each one of the convex lenses with a corresponding portion of an outer surface of the shell. The lenses are arranged in a closely adjacent relation with each other in such a manner that the convex face of the lens merges into the convex faces of the adjacent lenses. Whereby, no substantial dead-area is formed between the adjacent lenses to eliminate otherwise developed optical loss and therefore enhance collectivity of radiation from within the panoramic field of view.

The present invention also presents a low profile infrared motion detecting assembly which includes an optical detector in combination with the above lens system. The optical detector is disposed at a position offset towards the vertex from a point where optical axes of the outermost lenses at a maximum solid angle intersect with each other. Thus, the assembly is given a low-profile structure of the reduced exposure height. The optical detector is positioned such that each lens has the lead axis which is inclined at an angle of less than 20° relative to the optical axes of the same lens in order to achieve the low-profile structure with the widely distributed discrete sensitive areas of even size, yet assuring successful motion detection by the optical detector.

These and still other objects and advantageous features of the present invention will become more apparent from the following description of the embodiments when taken in conjunction with the attached drawings.

BRIEF DESCRIPTION OF THE DRAWINGS

FIG. 11 is a perspective view of a multi-lens system in accordance with a second embodiment of the present invention;

FIG. 12 is a vertical section of the above system;

DETAILED DESCRIPTION OF THE EMBODIMENTS

First Embodiment <FIGS. 1 to 7>

Figure 1:
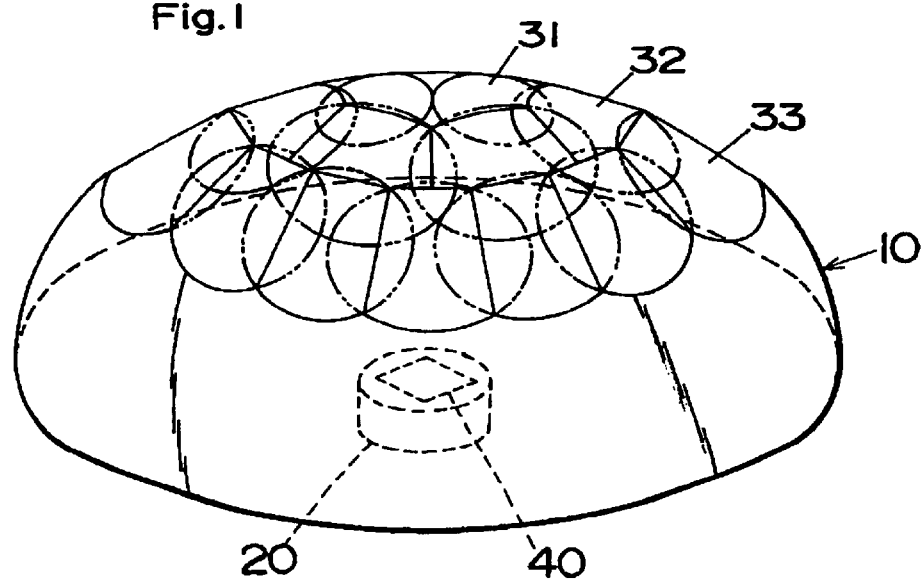
FIG. 1 is a perspective view of a multi-lens system in accordance with a first embodiment of the present invention.
Figure 2:
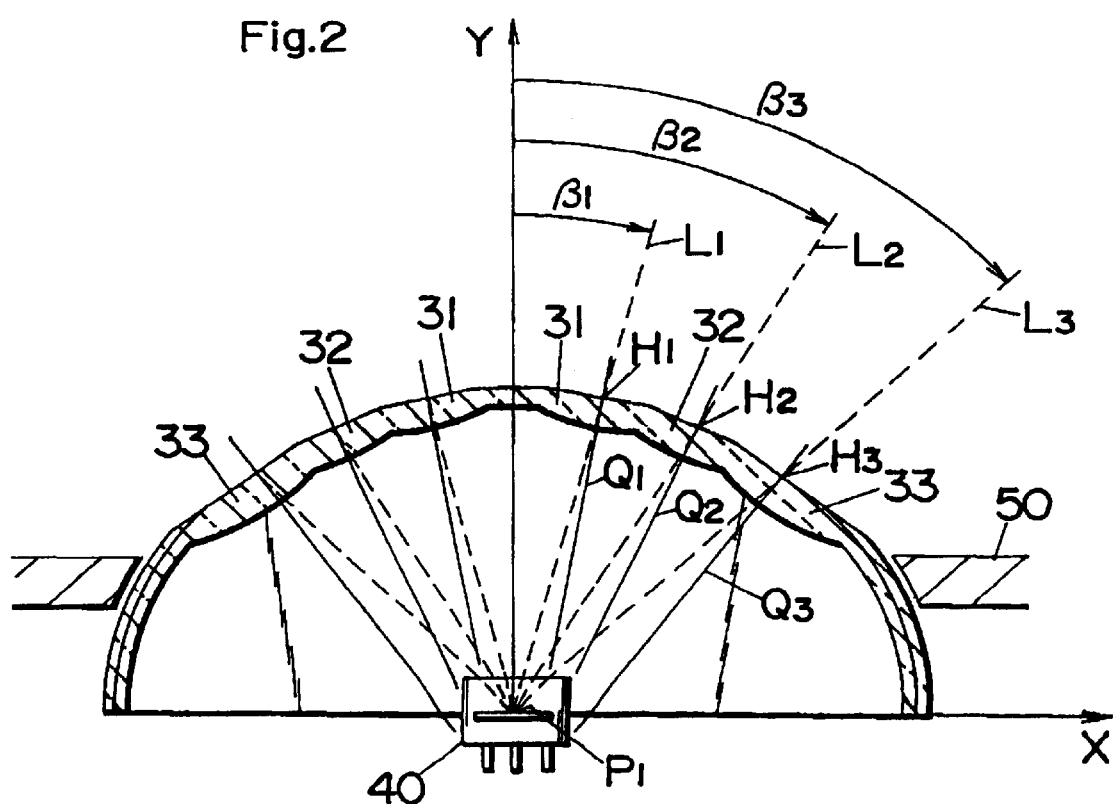
FIG. 2 is a vertical section of the above system.

Referring now to FIGS. 1 and 2, there is shown a multi-lens system in accordance with a first embodiment of the present invention. The system comprises a dome-shaped shell 10 with a plurality of convex lenses 31, 32, and 33 which provide a wide panoramic field of view from a focal region 20 in which an optical detector 40 is disposed for receiving infrared radiation through the individual lenses.

Figure 3:
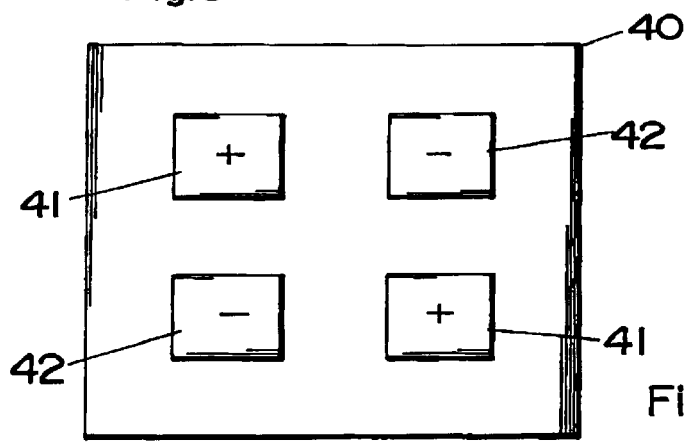
FIG. 3 is a plan view of an optical detector utilized in the above system.

As shown in FIG. 3, the optical detector 40 comprises two pairs of sensing elements 41 and 42 of square configuration and opposite polarity arranged in a square matrix on a radiation receiving surface of the detector 40. The sensing elements are of 0.5 mm square and spaced by 0.5 mm from each other to give output indicative of intensity of the infrared radiation received through the lenses to a known electric circuit for motion detection based upon the fluctuation of the intensity of the infrared radiation. The sensing elements 41 and 42 of opposite polarity give outputs of opposite polarity in order to cancel a background effect in determining the motion detection. The optical detector and its associated electric circuit for detection of motion are well known in the art and therefore no further explanation is deemed necessary here.

Figure 6:
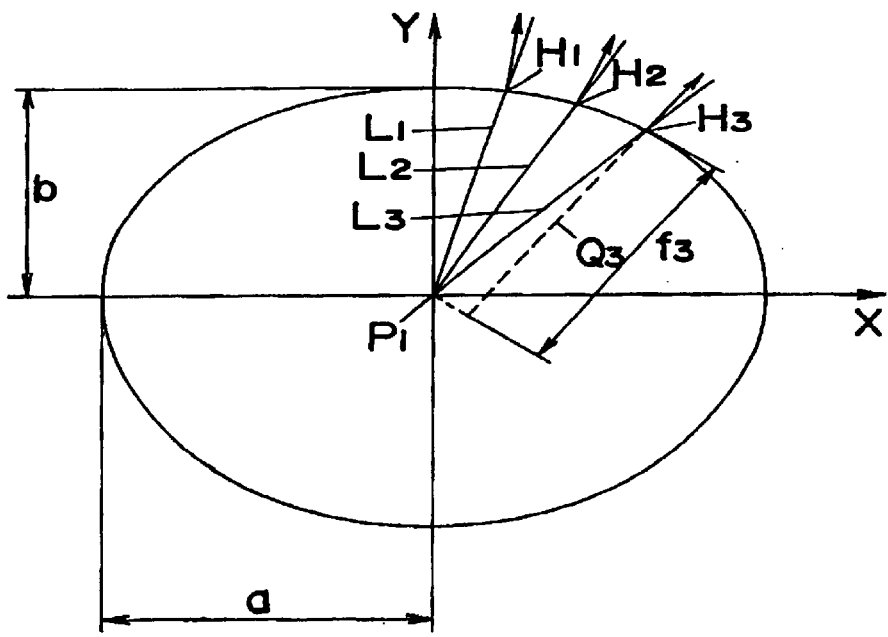
FIG. 6 is a schematic view illustrating a lens arrangement of the above system.

The dome-shaped shell 10 is made from a transparent plastic material such as polyethylene having a refractive index of 1.53 into a generally semi-ellipsoid, i.e., about half of an ellipsoid all of whose plane sections are ellipses. As shown in FIG. 2, the shell 10, i.e., semi-ellipsoid has a center axis Y which passes through a vertex of the semi-ellipsoid in a direction perpendicular to a tangent of the vertex. In this and other figures, an X-axis is introduced in order to describe a lens arrangement in an X-Y coordinate plane. The X-axis is shown to pass through a bottom of the shell 10 and the radiation receiving surface of the optical detector 40. As shown in FIG. 6, the above ellipse is dimensioned to have a major axis $2a$ of 16.2 mm and a minor axis $2b$ of 13.6 mm.

Figure 4:
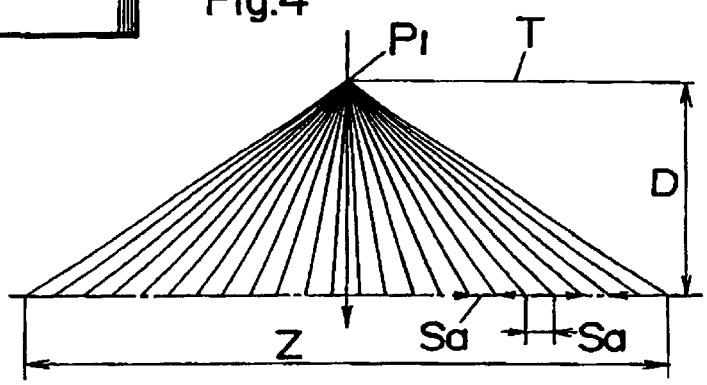
FIG. 4 is a vertical section illustrating a plurality of discrete sensitive areas formed by the above lens system.
Figure 5:
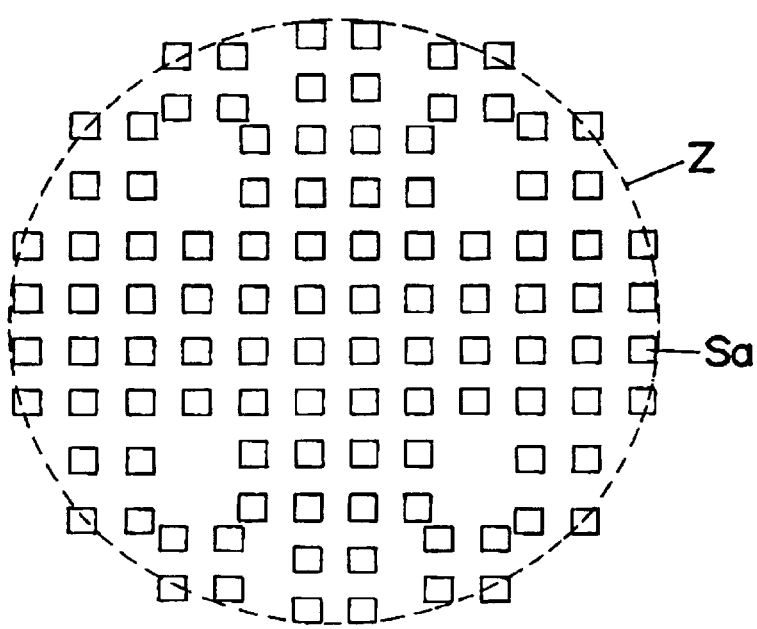
FIG. 5 is a schematic view illustrating the above discrete sensitive areas projected in a horizontal plane.

Turning back to FIG. 1, the lenses 31, 32, and 33 each of planoconvex configuration are distributed about the center axis Y in plural circular arrays composed of the first, second and third arrays arranged in this order from the center axis to a perimeter of the shell, the first array including four (4) pieces of lenses 31, the second array including eight (8) pieces of lenses 32, and the third array including fourteen (14) pieces of lenses 33. The lenses 31, 32, and 33 thus distributed provide a plurality of discrete sensitive areas Sa within the panoramic field of view, as shown in FIGS. 4 and 5 for collecting the infrared radiation from each of the areas Sa to the optical detector 40.

As shown in FIGS. 2 and 6, each of the lenses 31, 32, 33 has its principal points, more particularly, outer principal point H1, H2, and H3 on the surface of the ellipsoid. These principal points H1, H2, and H3 are located at different angular disposition in the X-Y plane about the center axis Y, i.e., at angles β1, β2, β3 of 15.3°, 31.9°, and 46.5°, respectively from a center of ellipse. The optical axes Q1, Q2, Q3 of the lenses 31, 32, 33 in the same circular array cross with each other on the center axis Y, but the optical axes of the lenses of the different circular arrays will not cross on the center axis Y. The optical axes Q3 of the lenses 33 at a greater angular disposition, for example, those of the third array has a crossing point which is spaced at a less distance from the X-axis than the crossing point of the other lenses 31 and 32 at a less angular disposition.

Figure 7:
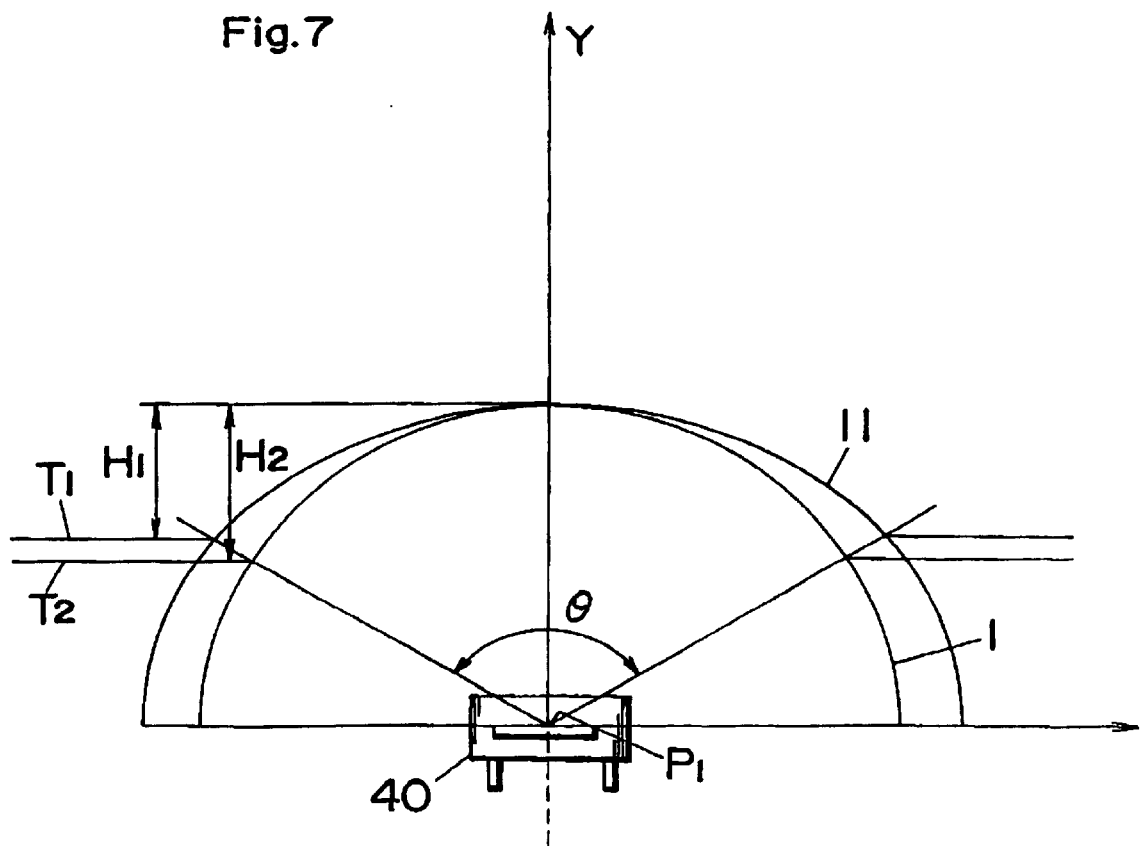
FIG. 7 is a schematic view demonstrating a low-profile structure obtained in the present invention with reference to the prior art lens system.

The optical detector 40 is disposed at a position offset towards the vertex of the shell 10 from the crossing point of the optical axes of the outermost lenses 33 at the greatest angular disposition about the center axis. Because of this and also because of that the principal points of the lenses are located on an ellipsoidal surface 11 of which curvature is greater towards the X-axis than at the center axis Y, as shown in FIG. 7, it is possible to reduce an exposure height H1 of the lens system above an installation surface T1 such as the ceiling of a room, while assuring the same view angle θ, i.e., solid angle from the optical detector 40, as compared to the prior art lens system in which all the lenses are located on a semispherical surface 1 to have the equal distance to the optical detector. That is, as shown in the same figure, the lens system of the present invention necessitates only the reduced exposure height H1 above the installation surface T1 measured from the vertex of the ellipsoid to the outermost lens along the center axis Y, while the prior art system requires a greater height H2 above the installation surface T2. In addition, since the distance between the principal point of the lens and the optical detector 40 is made greater for the lens at a greater angular disposition, it is possible to provide a plurality of discrete sensitive areas Sa of approximately even size, as shown in FIGS. 4 and 5.

In order to provide effective image spots on the optical detector 40 in the focal region sufficient for the motion detection, the focal length of the lens is made longer for the lens at a greater angular disposition. That is, the lenses 31, 32, and 33 has the different focal lengths f1, f2, and f3 of which relation is f1<f2<f3.

With the consequence of the above offset arrangement of the detector 40, all of the lenses have respective lead axes L1, L2, L3 which deviate by some angles with respect to the corresponding optical axes Q1, Q2, Q3. The lead axes of the lenses are defined to pass through the principal point H1, H2, H3 and a common point P1 at the optical detector 40, i.e., a center of the ellipse in the X-Y plane. In the illustrated embodiment, the deviation angle is made greater for the lenses at a greater angular disposition about the center axis Y, as shown in FIGS. 2 and 6, although this particular relation is not necessary in a possible modification in which another row of lenses are added in the periphery of the shell. In any case, the deviation angle is limited to such an extent that the image spot S formed on the detector 40 with attendant blurring will not bridge over the adjacent sensing elements 41 and 42 in the radiation receiving surface shown in FIG. 3.

A brief explanation is made for a design of the multi-lens system with reference to FIGS. 4, 5, and 6. For the sake of simplicity, the X-Y plane is used to describe a plane geometry of the lens system. Provided that the lens system includes a plurality of lenses of about 3 mm diameter having the respective principal points H1, H2, and H3 distributed along an ellipsoid and is installed on a ceiling 50 to provide a plurality of discrete sensitive areas Sa of about 200 mm square over a circular zone Z of 6.9 m diameter on a floor at a distance D of 2.8 m from a horizontal surface T at which the detector is mounted, there are determined view angles at which the lenses are disposed about the center P1 of the ellipse. Each sensitive area Sa is determined to have the area of about 200 mm square in order to cover a head of the person of which movement is to be detected. The principal points H1, H2, and H3 of the lenses are determined to be at angle of 15.3°, 31.9°, and 46.5° respectively about the center axis Y from the center P1. A minor axis 2b of the ellipse in the X-Y plane, corresponding to the height of the shell, is determined by using the following equation in order to make the image spot of radiation from sensitive area Sa on the sensing element of 0.5 mm square.

$$f_0 = d/D \cdot F \qquad \text{Eqauation (1)}$$

wherein d is a side of an image of the square sensing area Sa projected on the sensing element, D is a side of the sensing area Sa, and F is a vertical distance from the vertex of the shell to floor. Thus obtained f0 corresponds to a half of the minor axis 2b of the ellipse.

Then, the major axis 2a of the ellipse is selected to satisfy that each lens is given the lead axis which is inclined at an angle of less than 20° with respect to the optical axis of the same lens. Based upon the given parameters, i.e., the view angles of the lenses, and the minor and major axes of the ellipse, as well as upon the equation of the ellipse, the distances from the center P1 to the individual principal points H1, H2 and H3 of the lenses are obtained. Finally, the focal lengths f1, f2, and f3 for the lenses 31, 32, and 33 are given by projecting distances of the principal points H1, H2 and H3 form the center P1 respectively on the corresponding optical axes of the lenses in the X-Y plane of FIG. 6. In accordance with the above procedures, the focal length f1, f2 and f3 are determined respectively as 6.85 mm, 7.03 mm and 7.29 mm. Thus obtained focal lengths f1, f2 and f3 are longer in this order so that the discrete sensitive areas Sa given by these lenses will be made closer to a size of 200 mm square in order to arrange the sensitive regions of substantially even size.

The lenses are each of a planoconvex configuration having a plane outer surface and a curved inner surface. The radius of curvature for the curved inner surface for each lens is determined by using the following equation:

$$1/f = (n-1) \cdot (1/r_1 - 1/r_2) \qquad \text{Eauation (2)}$$

wherein f is a focal length, n is a refractive index of the lens material (n=1.53 in this instance), r1 is a radius of curvature of the outer surface, and r2 is a radius of curvature of the inner surface. Since the outer surface is flat, i.e., r1 is infinity, the outer lens having a greater angular disposition has a greater radius of curvature r2.

Figure 8:
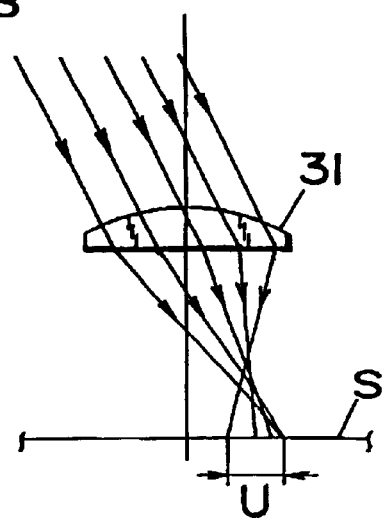
FIG. 8 illustrates a an acceptable image blurring appearing in the above system.
Figure 9A:
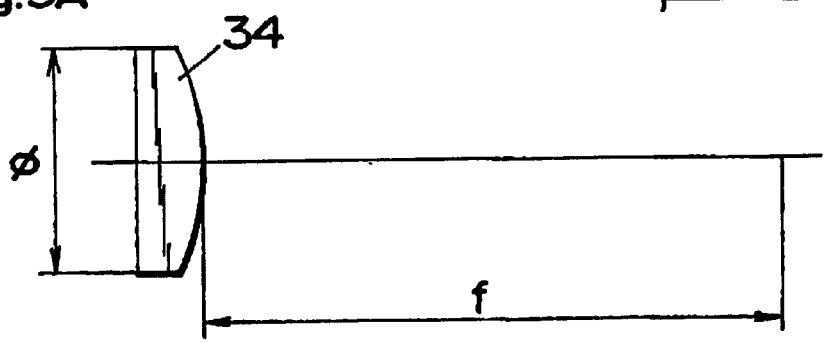
FIGS. 9A, 9B, and 9C are views illustrating different kinds of lenses employed for verification of the acceptable image blurring.
Figure 9B:
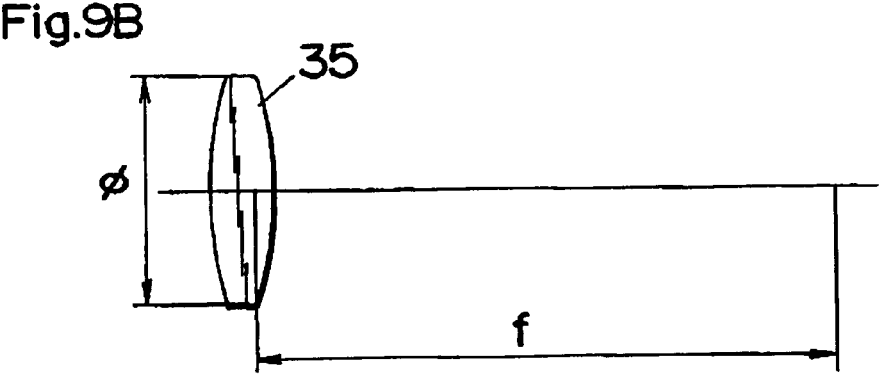
Figure 9C:
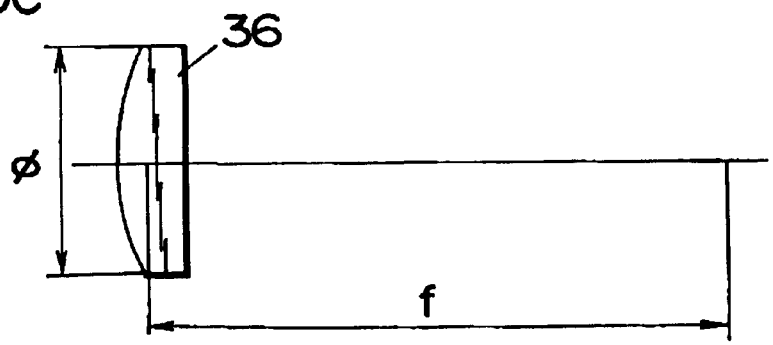
Figure 10:
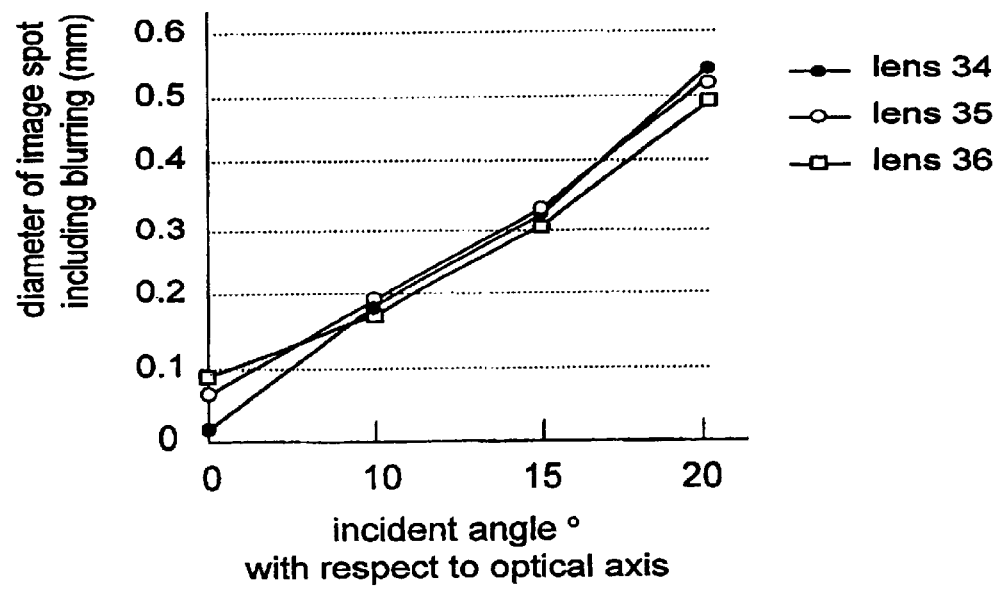
FIG. 10 is a graph illustrating a relation between an image spot obtained by the lenses of FIGS. 9A to 9C and an incident angle of radiation with respect to the optical axes of the lenses.

As a consequence of that the lenses have the deviation angle between their optical axes and the lead axes towards the center P1 or the optical detector 40, incident radiation along the lead axis will inevitably cause a blurred image U on the radiation receiving surface S, as shown in FIG. 8. In view of this, it is made to examine an allowable deviation angle range within which the blurring will not cause any detrimental effect for the motion detection, i.e., the blurred image spot U including the blurring will not extend over a gap distance of 0.5 mm between the adjacent sensing elements 41 and 42. For finding the allowable deviation angle range, simulative experiments were made for lenses 34, 35, 36 of uniform diameter φ of 3 mm but of different configurations, as shown in FIGS. 9A, 9B, and 9C. Each of the lenses has a focal length f of 6.80 mm which is selected to be smaller by some extent than that of the above lens 31 in order to exaggerate the blurring. FIG. 10 shows the result of the experiment, i.e., a relation between varying incident angle and the diameter of the image spots including the blurring for each of the lenses 34, 35, and 36. From this result, it is found that the image spot of less than 0.5 mm can be obtained with the incident angle of less than 20° for each of the lenses having the selected focal length. Based upon this allowable deviation angle range of less than 20°, the lenses of the present system are designed to have the individual principal points on the ellipse in order to provide the intended solid angle, i.e., a view angle θ of about 120° in the X-Y plane while keeping the deviation angle of less than 20°.

The lens may be alternately of biconvex configuration and may also have curved surfaces of hyperbolic configuration for minimizing undesired blurring.

Further, it is noted that the lenses 31, 32, and 33 are closely arranged so that the convex face of each lens merges into the convex faces of the adjacent lenses, leaving no lens portion or dead area between the adjacent lenses for effectively collecting the radiation without causing any substantial scattering of radiation which would otherwise occur at the step and bring about optical loss.

The lens system of the present invention could provide a panoramic field of view over a solid angle of about $2\pi$ steradians simply by providing an additional row of the lenses at a peripheral portion of the shell.

Second Embodiment <FIGS. 11 and 12>

Referring to FIGS. 11 and 12, there is shown a multi-lens system in accordance with a second embodiment of the present invention. The lens system of this embodiment is identical in configuration and operation to the first embodiment except that the outer surface of a dome-shaped shell 10A is formed as a smoothly curved surface coincidence with an ellipsoidal surface. Thus, the lenses 31A, 32A, and 33A are of biconvex configuration defined by the common outer curved surface and different inner curved surfaces. A like optical detector 40A is disposed at a center of the ellipse as in the first embodiment.

Figure 13:
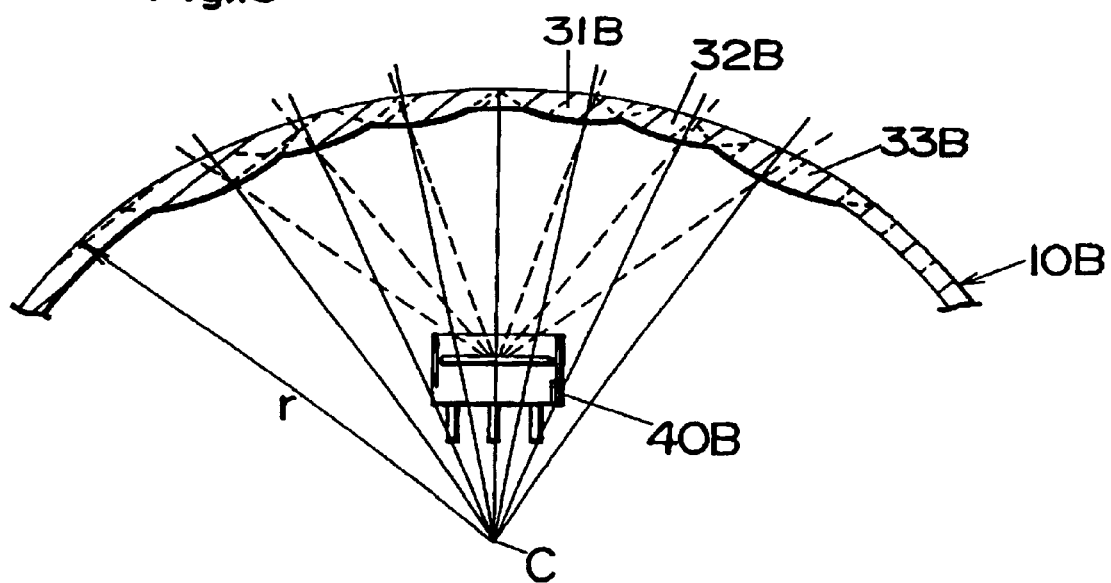
FIG. 13 is a vertical section of a multi-lens system in accordance with a third embodiment of the present invention.
Figure 14:
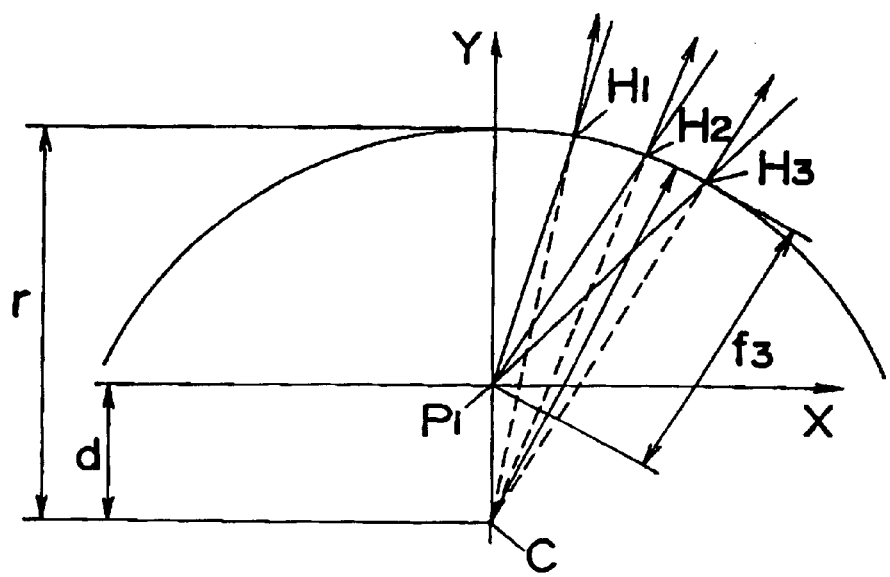
FIG. 14 is a schematic view of illustrating a lens arrangement of the above system.

Third Embodiment <FIGS. 13 and 14>

FIGS. 13 and 14 show a multi-lens system in accordance with a third embodiment which is similar to the first embodiment except that a domed-shell 10B is of a spherical configuration having an outer curved surface 11B coincident with a part of a sphere having a spherical center C. A like optical sensor 40B is located at a position offset from the center C towards a vertex of the shell 10B. As shown in FIGS. 13 and 14, the lenses 31B, 32B, and 33B have the respective principal points H1, H2 and H3 located on a spherical plane 11B of the shell 10B at different angles about a common point P1 on the optical detector 40B so that the lenses at a greater angular disposition is spaced by a greater distance from the common point P1. In detail, the outer surface 11B of the shell 10B has a radius (r) of 10.13 mm from the spherical center C, and the common center P1 is offset by a distance (d) of 3.62 mm from C towards the vertex. The focal lengths f1, f2 and f3 of the lenses 31B, 32B and 33B are determined in the like manner as in the first embodiment to be 6.57 mm, 6.62 mm, and 7.05 mm, respectively. The lenses are defined by the common spherical outer surface 11B and the different inner curves surfaces so as to have the different focal lengths. The lenses may be alternately of planoconvex configuration.

Figure 15:
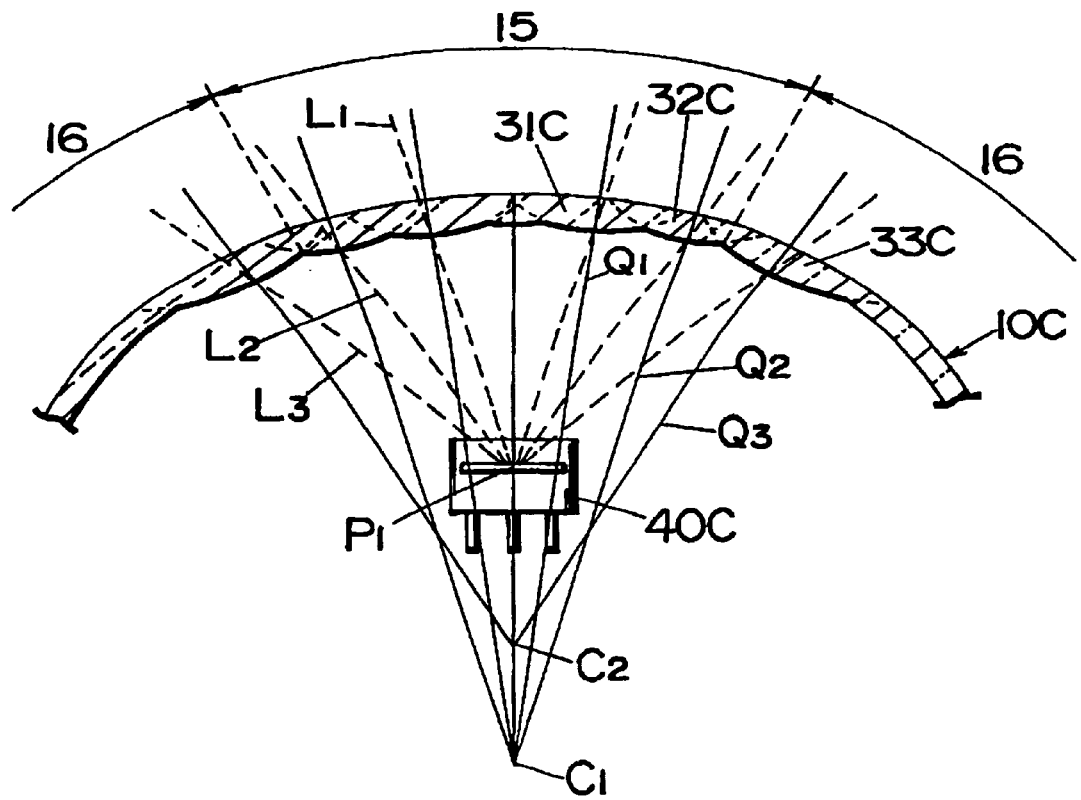
FIG. 15 is a vertical section of a multi-lens system in accordance with a fourth embodiment of the present invention.
Figure 16:
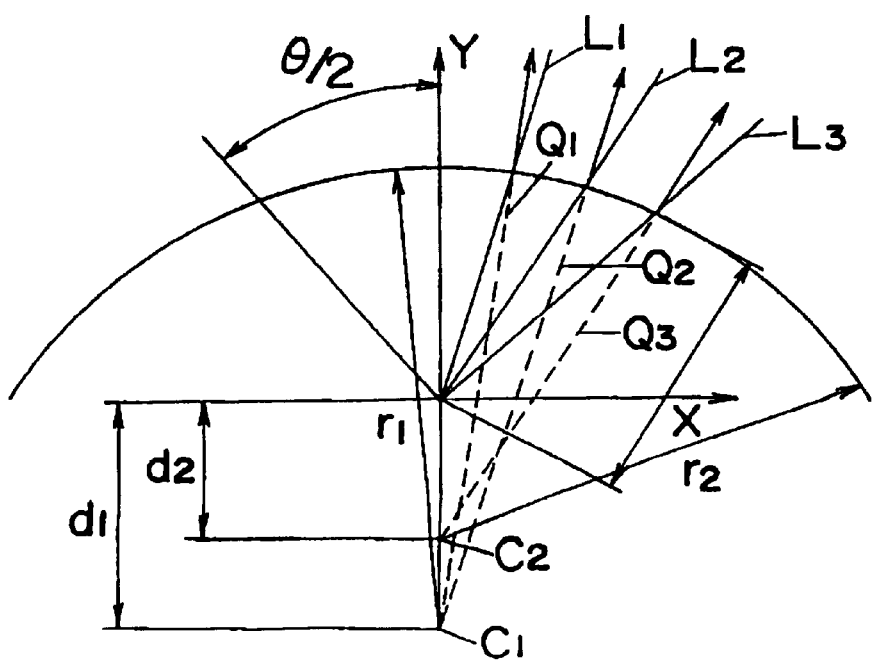
FIG. 16 is a schematic view of illustrating a lens arrangement of the above system.

Fourth Embodiment <FIGS. 15 and 16>

FIGS. 15 and 16 show a multi-lens system in accordance with a fourth embodiment of the present invention which is similar to the first embodiment except that a dome-shaped shell 10C comprises a center spherical segment 15 and an outer spherical segment 16 which has a curvature greater than that of the center spherical segment 15. The center spherical segment 15 has a radius (r1) of 12.42 mm from its spherical center C1 and the outer spherical segment 16 has a radius (r2) of 10.13 mm from its spherical center C2. These two spherical centers C1 and C2 are located on a center axis Y of the shell 10C and spaced from a common point P1 at the optical detector 40C by distances d1 and. d2 of 6.10 mm and 3.62 mm, respectively. The center spherical segment 15 is formed over a view angle $\theta$ of 78° from the common point P1 at the optical detector 40C. A plurality of the lenses 31C, 32C, and 33C are distributed over the center and outer segments 15 and 16. The lenses 31C, 32C, and 33C are made to have respective focal lengths f1, f2 and f3 of 6.38 mm, 6.58 mm and 7.05 mm and to have their principal points H1, H2, and H3 on a combined spherical curve of the shell with associated optical axes Q1, Q2, and Q3 directed to the corresponding spherical centers C1 and C2. It is noted in this connection that the deviation angle of each lens between the lead axis L1, L2, and L3 towards the common point P1 and the corresponding optical axis is kept less than 20° for reliable motion detection, while reducing the exposure height of the lens system, as in the previous embodiments.

This application is based upon and claims the priority of Japanese Patent applications No. 9-016942 filed in Japan on Jan. 30, 1997 and No. 9-336203 filed in Japan on Dec. 5, 1997, the entire contents of which are expressly incorporated by reference herein.

What is claimed is:

1. A low-profile dome-shaped multi-lens system for collecting infrared radiation from a panoramic field of view to an optical detector positioned in a focal region, said system comprising:

a dome-shaped shell having a vertex and a center axis extending through said vertex in a direction perpendicular to a tangent of said vertex;

a plurality of convex lenses being formed in said shell and distributed over a wide solid angular range about said center axis to provide a plurality of discrete sensitive areas within said panoramic field of view for surveillance by said detector, said convex lenses having individual optical axes;

said focal region being defined at a position offset towards said vertex from a point where said optical axes of the outermost lenses at a maximum solid angle about said center axis intersect with each other;

wherein said convex lens at a greater angular disposition about said center axis has a greater focal length in order to provide a substantial image spot in said focal region for detection of the infrared radiation through each of said convex lens by said optical detector.

2. The multi-lens system as set forth in claim 1, wherein said dome-shaped shell is formed along a curved surface of which curvature is greater towards its perimeter than at its vertex, the plurality of said lenses having the respective principal points positioned along said curved surface.

3. The multi-lens system as set forth in claim 1, wherein the dome-shaped shell comprise more than one spherical segments having different curvatures which are smaller at the segment closer a periphery of the shell than at the segment adjacent the vertex of the shell, a plurality of said lenses having the respectively principal points being arranged over said segments.

4. The multi-lens system as set forth in claim 1, wherein said dome-shaped shell is formed as a part of an ellipsoid having a minor axis coincident with said center axis.

5. The multi-lens system as set forth in claim 2, wherein said dome-shaped shell is formed as a part of a sphere and said focal region is positioned offset from a spherical center towards said vertex along said center axis.

6. The multi-lens system as set forth in claim 1, wherein each of said lenses defines a lead axis which passes through said principal point of said each lens and through a common point in said focal region, and said lead axis for each lens being inclined at an angle relative to said optical axis for the same lens within a common plane.

7. The multi-lens system as set forth in claim 1, wherein said dome-shaped shell is formed on its inner surface with a plurality of convex faces each forming said each one of said convex lenses with a corresponding portion of an outer surface of said shell, said lenses being arranged in a closely adjacent relation with each other in such a manner that the convex face of each said lens merges into the convex faces of the adjacent lenses.

8. The multi-lens system as set forth in claim 6, wherein said lens at a larger angular disposition about said center axis has a larger aperture.

9. A low profile infrared motion detecting assembly for detection of a motion based upon infrared radiation from a panoramic field of view, said assembly comprising:

optical detector which provides an output in response to receiving infrared radiation;

a dome-shaped shell having a vertex and a center axis extending in a direction perpendicular to a tangent of said vertex;

a plurality of convex lenses being formed in said shell and distributed over a wide solid angular range about said center axis to provide a plurality of discrete sensitive areas within said panoramic field of view for surveillance by said detector said optical detector disposed at a position offset towards said vertex from a point where optical axes of the outermost lenses at a maximum solid angle about said center axis intersect with each other;

wherein said convex lens at a greater angular disposition about said center axis has a greater focal length in order to provide a substantial image spot on said optical detector for detection of the infrared radiation through each of said convex lens by said optical detector.

10. The infrared motion detecting assembly as set forth in claim 9, wherein each of said lenses defining a lead axis which passes through said principal point of said each lens and through said optical detector, said lead axis for each lens being inclined at an angle relative to said optical axis for the same lens within a common plane, and said optical detector being positioned at such a position that the lead axis of each lens is inclined relative to the optical axis of the same lens at an angle of less than 20°.

* * * * *

UNITED STATES PATENT AND TRADEMARK OFFICE
CERTIFICATE OF CORRECTION

PATENT NO. : 6,051,836
DATED : April 18, 2000
INVENTOR(S) : S. KIRIHATA et al.

It is certified that error appears in the above-identified patent and that said Letters Patent is hereby corrected as shown below:

At column 9, line 12 (claim 9, line 4) of the printed patent, before "optical" insert ---an---.

Signed and Sealed this

Twenty-fourth Day of April, 2001

Attest:

NICHOLAS P. GODICI

Attesting Officer       Acting Director of the United States Patent and Trademark Office